No. 872,289. PATENTED NOV. 26, 1907.
E. D. LEWIS.
CONTROLLING MECHANISM FOR ELECTRIC MOTORS.
APPLICATION FILED JUNE 18, 1907.

2 SHEETS—SHEET 1.

WITNESSES:
M. E. Verbeck.
L. V. Stoltzlen

INVENTOR
Edward D. Lewis
BY
Eugene Diven
ATTORNEY

No. 872,289. PATENTED NOV. 26, 1907.
E. D. LEWIS.
CONTROLLING MECHANISM FOR ELECTRIC MOTORS.
APPLICATION FILED JUNE 18, 1907.

2 SHEETS—SHEET 2.

WITNESSES:

INVENTOR
Edward D. Lewis
BY
ATTORNEY

UNITED STATES PATENT OFFICE.

EDWARD D. LEWIS, OF ELMIRA, NEW YORK, ASSIGNOR TO LEWIS MOTOR & CRANE COMPANY, A CORPORATION OF MAINE.

CONTROLLING MECHANISM FOR ELECTRIC MOTORS.

No. 872,289.   Specification of Letters Patent.   Patented Nov. 26, 1907.

Application filed June 18, 1907. Serial No. 379,556.

*To all whom it may concern:*

Be it known that I, EDWARD D. LEWIS, a citizen of the United States, residing at Elmira, in the county of Chemung and State of New York, have invented certain new and useful Improvements in Controlling Mechanism for Electric Motors, of which the following is a specification.

This invention relates to improvements in the means for stopping, starting and reversing electric motors; and the object of my improvements is to provide a switch, in combination with a system of wiring at and between the switch and motor, whereby, when starting the motor in either direction, the field will be saturated in advance of the armature, the armature being entirely cut out during this initial saturation of the field. A quick and strong starting torque will thus have been produced in the field magnets just before the armature is cut in.

A further object is to accomplish the stopping of the motor by cutting out the armature in advance of the field, and utilizing the full current to energize the field magnets after the armature is cut out, thereby producing a strong and effective retarding force in the motor itself to quickly arrest the motion of the armature.

I attain my objects by a switch constructed and connected with a motor in the manner illustrated in the accompanying drawings, in which—

Figure 1:
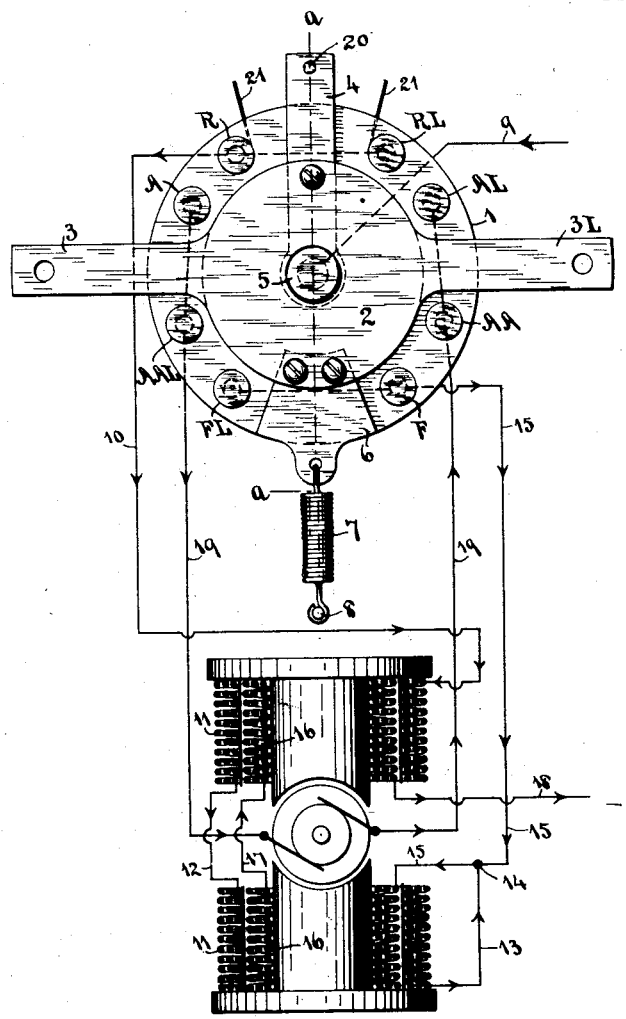
Figure 2:
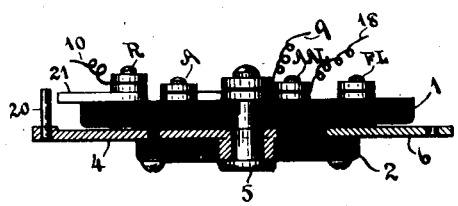
Figure 3:
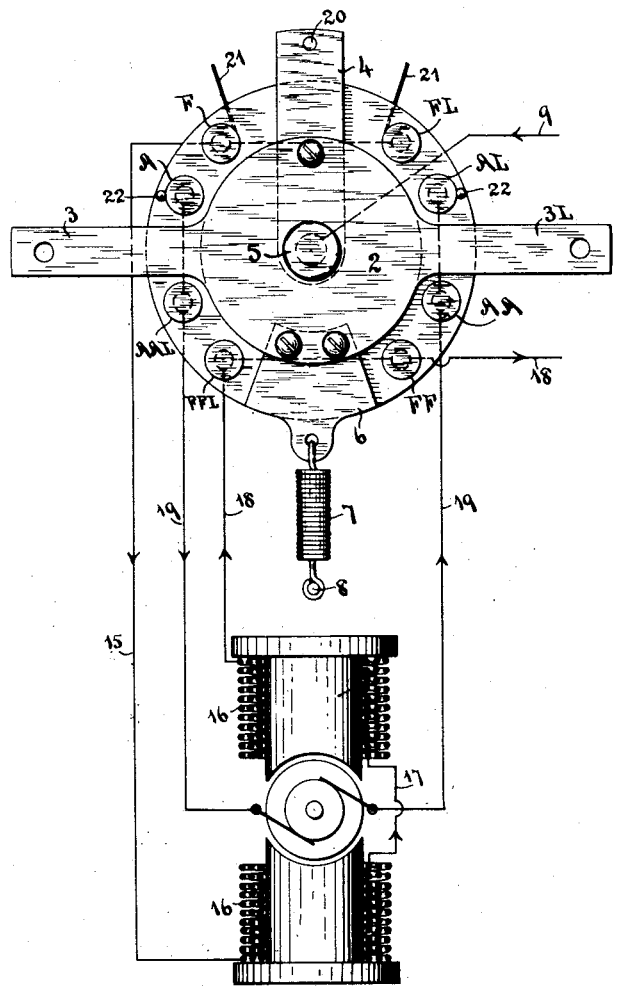

Figure 1 represents a front elevation of the switch together with a diagrammatic illustration of a series wound motor, and the connections between the motor and the switch; Fig. 2, a sectional view of the switch looking to the left on the line *a—a* in Fig. 1; and Fig. 3, an illustration of the switch as applied to a shunt wound motor.

Like numerals and letters of reference indicate like parts in the several views.

In applying my invention to a series wound motor, I provide a supplementary resistance which shall be the equivalent of the armature, and in order to utilize this resistance for the purpose of imparting additional magnetic force in the field of the motor, I arrange the resistance in the form of coils of wire wound around and insulated from the field coils, said resistance coils being connected with the field coils in series and having the current passed through in the same direction as it passes through the field coils.

This arrangement of the field and resistance coils will be understood from an inspection of Fig. 1, wherein 11 indicates the resistance coils and 16 the field coils.

The switch and connections for operating this motor are arranged as follows: The switch consists of a base, or back-plate 1, of insulating material, having a series of contacts arranged thereon in a circle around a central pivot pin 5. These contacts are in the form of metal buttons projecting slightly beyond the face of the back-plate, and are indicated by the designating letters to which reference will be made hereafter. These contacts are provided at the back of the plate 1 with binding posts to receive the connecting wires; and the pivot pin 5 is connected by means of a binding post with one branch of the current supply loop; this main supply wire being indicated by the numeral 9.

Mounted upon the pivot pin 5 is a disk 2 of insulating material, having the extensions 3 and 3L projecting from opposite sides thereof and constituting a rock arm by which the switch is operated. The disk 2 is of insulating material, and, at diametrically opposite sides, is provided with the contact plates 4 and 6, plate 4 being provided with a hub which engages the pin 5, thereby placing said plate in connection with the supply wire 9. This plate 4 is a narrow strip of metal which projects beyond the disk 2, in position to engage the contacts separately as the rock arm is turned in one direction or the other. The plate 6 is insulated by the disk 2 from the plate 4, and is made sufficiently broad to span the space between a pair of contacts positioned on either side thereof. To hold the rock arm in mid position, and to return it automatically to such position when the arms 3 or 3L are released, I may provide a coiled spring 7 attached to a fixed pin 8. This feature, however, is not essential and may be omitted if desired.

At each side of the contact-plate 4 are the contacts marked R and RL, connected together by a wire, said wire running thence to one end of the resistance coils. This wire 10 is shown connected with the outer coil of the upper resistance 11, the inner coil of said resistance being connected by wire 12 to the inner coil of the lower resistance 11, and the outer coil of said lower resistance being connected in turn by the wire 13 with the wire 15, which runs to the outer coil of the lower field 16. The inner coil of said field is connected by wire 17 with the inner coil of the upper field 16, and the outer coil of said upper field is connected to the wire 18, which constitutes the other branch of the supply loop; thus providing a continuous circuit from the contacts R and RL through the resistance coils and thence through the field coils and the return supply wire. The contacts A and AL are connected with corresponding contacts positioned below at opposite sides of contact plate 6, marked respectively AAL and AA, and are thence connected by wires 19 with the armature brushes. Adjacent the contact plate 6, and at each side thereof are the contacts F and FL, connected together, and by the wire 15 connected with the field.

The operation of the switch and the motor governed thereby will be as follows:—When the switch is in the position shown in Fig. 1 no current will be passing through the motor. To start the motor in one direction, the arm 3 will be pulled down until contact plate 4 engages contact R, the current will then pass from wire 9, through plate 4 and contact R, through wire 10 in the direction indicated by the arrow marks into and through the resistance coils, thence by way of wires 13 and 15 into and through the field coils, and out by way of the wire 18 to the main supply circuit, thereby carrying the entire current around the field magnets and producing therein a strong starting torque. The arm 3 is now pulled still farther down, thereby causing the plate 4 to pass from contact R into engagement with contact A, cutting out the resistance and causing the current to pass from wire 9 through contact A and, by way of the wires 19 and the brushes, through the armature, the armature circuit being completed through contact AA, which is now connected by plate 6 with contact F; said plate 6 bridging the distance between said contacts AA and F when plate 4 is in engagement with contact A. The current therefore now passes from the armature directly into the field coils by way of contact F and wire 15, and thence out through return wire 18. The motor will, therefore, be quickly started, and will continue to run at full speed until it is desired to stop it. If the motor is to be run at different speeds, any approved speed controller may be connected in with wire 9.

In stopping the motor, the arm 3 will be moved back to its original position, either by the operator, or automatically, by the spring 7, when the arm is released. In passing back to their open positions, the contact plates 4 and 6 first cut out the armature, the resistance being cut in at the same time, thereby preventing the full current from passing through the field coils and burning them out; also, during this period of engagement of plate 4 with contact R, the full current will be passing through the resistance and field coils, thereby again strongly energizing the field magnets, and producing therein a strong retarding force, which acts as a brake to quickly arrest the motion of the armature.

To reverse the motor, the arm 3L will be drawn down, thereby placing contact-plate 4 first in engagement with contact RL, and afterwards in engagement with contact AL; plate 6 connecting contacts FL and AAL, when plate 4 engages contact AL. When in this latter position, the current from wire 9 will pass from contact AL through the wires 19 and back to contact AAL in reversed direction, and thence through plate 6 and contact FL to the field; without, however, changing the direction of the current through the field; thus reversing the armature poles, and causing the armature to run in the reverse direction.

To prevent drawing an arc from contacts R or RL when plate 4 passes out of engagement therewith, I provide snap springs 21, which are engaged by the pin 20 on plate 4. As said plate passes off from the contacts, said springs, when released from the pin 20, fly back to normal position, thereby breaking the arc.

In shunt wound motors the field coils will take the full current when the armature is cut out, and there is, therefore, no need of the resistance. The switch will be wired to such a motor in the manner illustrated in Fig. 3. Here I have marked the first contact of each upper pair F and FL, as they are connected directly with the field, instead of being connected to the field through the resistance, as in the series wound motor. Also the plate 4 is made broader, so as to bridge the distance between the field and armature contacts, when the motor is running. In starting this motor, when arm 3 is pulled downward, plate 4 will first engage contact F thereby causing the current to flow by way of wire 15 through the field coils, and thence by wire 18, which is now connected with the contacts FFL and FF back to the supply circuit, thus saturating the field before the armature is cut in. As the arm 3 is pulled still further down, plate 4 engages contact A and, being still in engagement with contact F, the current from wire 9 splits, part of it continuing to pass through the field and the other part passing, by way of contact A, through the armature and thence to contact AA, which is connected by plate 6 with contact FF; the current shunted through the armature being thus brought back into the wire 18. At 22, I place stops by which the plate 4 is prevented from being thrown beyond the point where it will short circuit the contact pairs at either side of it. To reverse the motor, the arm 3L will be pulled down, thereby reversing the direction of the current through the armature circuit, the direction of the current through the field remaining the same.

This controlling device is especially adapted for motors used in connection with hoists and other machinery wherein it is desirable that the motor shall be quickly stopped, started, or reversed. While I have shown the switch and connections arranged for reversing the motor, it will be understood that by omitting one set of contacts, the switch may be applied simply to nonreversible motors.

What I claim as my invention and desire to secure by Letters Patent is—

1. The combination, with a motor, of a resistance the equivalent of the armature, a switch, and conductors connecting the field, the armature and said resistance with separate contacts on the switch, whereby in starting the motor the current will be applied to the field and the resistance simultaneously and afterwards to the armature, the resistance being cut out when the armature is cut in, and whereby in stopping the motor the resistance will be cut in when the armature is cut out.

2. The combination, with a motor, of resistance coils wound around the field coils and connected in series therewith, a switch and conductors connecting the field, the armature and the resistance with separate contacts on the switch, whereby in starting the motor the current will be applied to the resistance and thence to the field and afterwards to the armature and thence to the field, the resistance being cut out when the armature is cut in, and whereby in stopping the motor the armature will be cut out and the resistance cut in and subsequently the resistance and field cut out.

3. The combination, with a motor, of a switch comprising a rock arm having two oppositely disposed contact plates mounted thereon and insulated from one another, one of said plates being connected with the current supply, a pair of contacts adapted to be engaged by said current supply plate, and a pair of contacts adapted to be engaged by the other plate, the first contact of each pair being in circuit with the field and the second contact of each pair being in circuit with the armature.

4. The combination, with a motor, of a switch comprising a rock arm having two oppositely disposed contact plates mounted thereon and insulated from one another, one of said plates being connected with the current supply, a pair of contacts adapted to be engaged by said current supply plate, a pair of contacts adapted to be engaged by the other plate, the first contact of each pair being in circuit with the field and the second contact of each pair being in circuit with the armature, and two other pairs of contacts placed on opposite sides of the contact plates from the first pairs and connected in like manner with the field and armature circuits, whereby the motor may be reversed when the arm is turned in the opposite direction.

In testimony whereof I have affixed my signature, in presence of two witnesses.

EDWARD D. LEWIS.

Witnesses:
M. E. VERBECK,
L. V. STOELTZLEN.